(12) United States Patent
Still et al.

(10) Patent No.: US 6,486,799 B1
(45) Date of Patent: Nov. 26, 2002

(54) COMPUTER BASED HUMAN-CENTERED DISPLAY SYSTEM

(75) Inventors: David L. Still, Pensacola, FL (US); Leonard A. Temme, Pensacola, FL (US)

(73) Assignees: The University of West Florida, Pensacola, FL (US); The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/619,206

(22) Filed: Jul. 19, 2000

Related U.S. Application Data
(60) Provisional application No. 60/144,221, filed on Jul. 19, 1999.

(51) Int. Cl.$^7$ ................................................ G01C 21/00
(52) U.S. Cl. .................. 340/974; 340/961; 340/971; 340/975; 340/978; 340/980; 701/9; 701/14
(58) Field of Search ................................ 340/971, 973, 340/974, 975, 980, 946, 961; 73/178 H; 701/9, 14, 3

(56) References Cited

U.S. PATENT DOCUMENTS

| | | | | |
|---|---|---|---|---|
| 3,709,033 A | * | 1/1973 | Pollitt ....................... 73/178 T |
| 4,195,293 A | | 3/1980 | Margolin ..................... 358/183 |
| 4,740,779 A | * | 4/1988 | Cleary et al. ............... 340/974 |
| 5,181,028 A | * | 1/1993 | Sharpe et al. ............... 340/975 |
| 5,212,480 A | * | 5/1993 | Ferro .......................... 340/973 |
| 5,296,854 A | * | 3/1994 | Hamilton et al. ........... 340/973 |
| 5,420,582 A | * | 5/1995 | Kubbat et al. .............. 340/973 |
| 5,745,054 A | | 4/1998 | Wilkens ...................... 340/972 |
| 5,797,562 A | * | 8/1998 | Wyatt .......................... 340/973 |
| 6,111,525 A | * | 8/2000 | Berhoz et al. .............. 340/973 |
| 6,121,899 A | * | 9/2000 | Theriault .................... 340/980 |

FOREIGN PATENT DOCUMENTS

| | | |
|---|---|---|
| EP | 0 418 558 A2 | 8/1990 |
| EP | 0 493 822 A1 | 12/1991 |

OTHER PUBLICATIONS

SAE Technical Paper Series, "Use of High Fidelity Simulation in the Development of an FA/18 Active Grand CAS", Fitzgerald et al., Oct. 5–8, 1992.*

(List continued on next page.)

*Primary Examiner*—Brent A. Swarthout
(74) *Attorney, Agent, or Firm*—Lawrence R. Oremland, P.C.

(57) ABSTRACT

A human centered informational display is disclosed that can be used with vehicles (e.g. aircraft) and in other operational environments where rapid human centered comprehension of an operational environment is required. The informational display integrates all cockpit information into a single display in such a way that the pilot can clearly understand with a glance, his or her spatial orientation, flight performance, engine status and power management issues, radio aids, and the location of other air traffic, runways, weather, and terrain features. With OZ the information is presented as an integrated whole, the pilot instantaneously recognizes flight path deviations, and is instinctively drawn to the corrective maneuvers. Our laboratory studies indicate that OZ transfers to the pilot all of the integrated display information in less than 200 milliseconds. The reacquisition of scan can be accomplished just as quickly. Thus, the time constants for forming a mental model are near instantaneous. The pilot's ability to keep up with rapidly changing and threatening environments is tremendously enhanced. OZ is most easily compatible with aircraft that has flight path information coded electronically. With the correct sensors (which are currently available) OZ can be installed in essentially all current aircraft

27 Claims, 3 Drawing Sheets

OTHER PUBLICATIONS

Bergen, J.R.: Theories of visiual texture perception. In. Spatial Vision. Ed. David Regan, vol. 10, Vvision and Visual Dysfunction General Editor J.R. Cronley–Dillon. CRC Press., Inc., Boca Raton, 1991, 71–92.

Capote, G.: The role of the background: texture segregation and figure–ground segmentation. Vision Research 1996 Sep; 36(18):2815–2826.

Goodenough, B., Gillam, B.: Gradients as visual primitives. J Exp Psychol Hum Percept Perform 1997 Apr; 23(2):370–397.

Hogervorst, M.A. Kappers, A.M, Koenderink, J.J.: Structure from motion: a tolerance analysis. Percept Psychophys 1996 Apr; 58(3): 449–459.

Julesz, B.: Figure and ground perception in briefly presented isodipole textures. In: Perceptual Organization, Eds.: M. Kubovy and J. Pomerantz, Lawrence ERlbaum Associates, Hillsdale, NJ 1981.

Julesz, B., Caelli, T.: On the limits of Fourier decompositions in visual texture perception., Perception 1979;8(1): 69–73.

Kastner, S., Nothdurft, H. C., Pigarev, I. N.: Neuronal correlates of pop–out in cat striate cortex. Vision Research 1997 Feb; 37(4): 371–376.

Lamme, V. A.: The neurophysiology of figure–ground segregation in primary visual cortex. J Neurosci 1995 Feb; 15(2):1605–1615.

Leibowitz, H.: Post, R. B.: Two modes of processing concept and some implications. In: Organization and Representation in Perception. Ed: J. Beck, Erlbaum, 1982.

Leibowitz, H., Shupert, C. L.: Low luminance and spatial orientation: In Proceedings of the Tri–Service Aeromedical Research Panel Fall Technical Meeting, Naval Aerospace Medical Research Laboratory, Pensacola, FL; NAMRL Monograph–33, 1984, 97–104.

Leonards, U., Singer, W., Fahle, M.: The influence of temporal phase differences on texture segmentation. Vision Research 1996 Sep; 36(17): 2689–2697.

Lind, M.: Perceiving motion and rigid structure from optic flow: a combined weak–perspective and polar–perspective approach. Percept Psychophys 1996 Oct; 58(7): 1085–1102.

Pollick, F. E.: The perception of motion and structure in structure–from–motion: comparisions of affine and Euclidean formulations. Vision Research 1997 Feb; 37(4): 447–466.

Post, R. B., Leibowitz, H. W.: Two modes of processing visual information: implications for assessing visual impairment. Am J Optom Physiol Opt 1986 Feb; 63(2): 94–96.

Senders, J.: Visual Scanning Processes, 1980. Available from J Senders, University of Toronto.

Siddiqi, K., Tresness, K. J., Kimia, B.B.: Parts of visual form: psychophysical aspects. Perception 1996; 25(4): 399–424.

Simoneau, G. G., Leibowitz, H. W., Ulbrecht, J. S., Tyrrell, R. A., Cavanagh, P. R.: The effects of visual factors and head orientation on postural steadiness in women 55 to 70 years of age. J. Gerontol 1992 Sep; 47(5) M151–M158.

Temme, L. A. Woodall, J., Still, D. L.: Calculating A Helicopter Pilot's Instrument Patters From Discrete 60 Hz Measures Of The Line–Of–Sight: The Evaluation Of An Algorithm. Paper in Review.

Thibos, L. N., Still, D. L., Bradley. A.: Characterization of Spatial aliasing and contrast sensitivity in peripheral vision. Vision Research, 36, 249–258, 1996.

Thibos, L. N., Bradley, A.: Modeling off–axis vision–II: The effects of spatial filtering and sampling by retinal neurons. In Vision Models for Target Detection and Recognition: World Scientific Press, Singapore, 1995.

Turano, K, Herdman, S. J., Dagnelie, G.: Visual stabilization of posture in retinitis pigmentosa and in artifically restricted visual fields. Invest Ophthalmol Vis Sci 1993 Sep; 34(10): 3004–3010.

Wade, M. G., Jones, G.: The role of vision and spatial orientation in the maintenance of posture. Phys. Ther 1997 Jun; 77(6): 619–628.

Wertheim, T.: Peripheral visual acuity (1894). Translated by Dunsky IL Am J Optom Physiol Opt 1980 57: 919–924.

Wickens, C. W.: The effects of control dynamics on performance. Chapter 39; In: The Handbook of Perception and Human Performance, Eds.: K. Boff, L. Kaufman, and J. Thomas; 1986; John Wiley and Sons, New York.

Williams, D. R., Coletta, N. J.: Cone spacing and the visual resolution limit. Journal of the Optical Society of America, A, 4, 1514–1523 1988.

* cited by examiner

COMPUTER BASED HUMAN-CENTERED DISPLAY SYSTEM

RELATED APPLICATION/CLAIM OF PRIORITY

This application is related to and claims priority from Provisional Application Ser. No. 60/144,221, entitled "A Computer Based Human-Centered Display System For Aviation Parameters Information", filed Jul. 19, 1999.

GOVERNMENT SUPPORT

The present invention was at least partially supported by the National Aeronautics and Space Administration (NASA), Ames Research Center, under Government Contract Nos. NAG2-1225 and NAG2-1332.

BACKGROUND OF THE INVENTION

1. Field of the Invention

This invention relates to a computer based human-centered display for e.g. a vehicle, and particularly to a display in which important operational and positional information are displayed to the person(s) controlling the vehicle in a way designed to provide immediate comprehension by that person of the location, orientation and operational parameters of the vehicle. The principles of the invention are particularly useful in providing a display to person(s) controlling an aircraft, i.e. either the pilot(s) flying the aircraft or, in the case of a remotely controlled vehicle, the remotely located human controlling the vehicle.

2. Description of the Prior Art

Current state-of-the-art instrumentation in a cockpit is usefully categorized into flight, engine, weather, and radios instruments. The flight instruments consist of several discrete displays that must be individually viewed. Information from several of these discrete displays is required for the pilot to form a mental image of the aircraft's position and flight path. During instrument flight, the pilot maintains a rigorous scan of these flight instruments and cannot afford to let the scan of the flight instruments "break down," since safe instrument flight requires the pilot to maintain an accurate mental model of the aircraft's position and flight path. This mental model depends upon the information obtained from the flight instruments. If the scan does break down, it takes time to restart the information collection as well as update and correct the mental model (15 and 18). The time a pilot takes to view and interpret the flight instruments limits the speed with which the pilot can respond as well as the time and resources the pilot has to allocate to all the other tasks necessary to fly the aircraft. It is only after considerable training and experience that a pilot is adequate for this demanding task. If the vehicle were e.g. a remote controlled aircraft or a remote controlled submarine, in which a human controlling the vehicle but located remotely from the vehicle was being fed the same type of information as a pilot as to the operation, orientation and location of the vehicle, the same type of problems would be present. To overcome these difficulties requires a totally different approach to a human centered information display for e.g. a cockpit or a remotely located human controller, is provided. That solution is sometimes referred to herein as "OZ".

The problem underlying the invention, and the solution described below, are described in connection with a cockpit display for a pilot flying an aircraft, but it will be clear to those in the art that the principles of the invention are applicable to various types of vehicles and/or other operational environments in which rapid human centered perception of an operational environment is required.

Problem

All conventional flight instrument displays require directed focal attention; the pilot must look at, or at least near, each instrument. To understand what the aircraft is doing, the pilot has to interpret what the instrument is indicating, and integrate that information with information from the other instruments. These requirements introduce substantial perceptual delays and a significant mental workload. For example, since viewing one instrument requires a minimum of about 200 milliseconds, the fastest that 5 instruments can be viewed is about 1 second (21). These delays severely limit pilots' ability to cope with turbulence, rapidly changing situations, and emergencies. Furthermore, when deviations from flight path occur, even substantial ones, the instruments do not grab the pilot's attention. Thus the pilot must continually scan or monitor the instruments to determine whether the aircraft has strayed from its intended flight path. Because conventional instruments require essentially constant attention, pilots develop rigorous continuous and routinized instrument scan strategies. Moreover, current flight instruments do not share a common frame of reference nor do they facilitate integration with the other three important areas of cockpit instrumentation; engine, weather, and radio instruments. This lack of integration conflicts with the requirements for instrument scan and compounds the problems of instrument flight. In the past, the solutions to these problems have been to severely limit the flight envelope of the aircraft, emphasize specific scan training, and require extensive pilot experience.

Requirements: The Ideal Display

The pilot's display should allow essentially instantaneous comprehension of aircraft performance, location, and environment. Flight instruments should be designed to grab attention when deviations from flight path occur. Flight instruments should allow for the uninterrupted and effortless comprehension of flight path and spatial localization, even when focal attention is directed toward other tasks. A pilot's Situational Awareness depends in large part on the ability to integrate many different sources of information. This integration is facilitated when the different instruments, and the real world, use a common frame of reference.

SUMMARY OF THE INVENTION

Accordingly, an object of this invention is a display that will provide a pilot with all information to fly the aircraft.

Another object of the invention is to provide a display that clearly informs the pilot of aircraft orientation and movement.

In addition, an object of the invention is an informational display that will not distract the pilot from flying the craft while providing information regardless of where the information is displayed in the visual field.

Still another object of the invention is an informational display that can be used with remotely controlled vehicles and in other operational environments where rapid human centered comprehension of an operational environment is required.

According to a broad aspect of the invention, a vehicle such as an aircraft has a sensing system configured to sense orientation and/or location parameters of the aircraft and a plurality of operational parameters of the aircraft, and a processing system is configured to process the sensed parameters for display on a visual display. An informational display, according to the invention, provides perceptual primitives configured into metaphorical structures whose appearance and locations conveys information simultaneously about the orientation, location and operational parameters of the aircraft, and the processing system is configured to process the sensed parameters and to produce the visual display in perceptual primitives according to the metaphorical structures.

Preferably, the metaphorical structures are configured to convey the information regardless of the extent of a viewer's visual field (e.g. across the viewer's central and peripheral vision field), and within a time frame of less than 200 milliseconds.

In a particularly important adaptation of the present invention to a vehicle, the orientation and/or location parameters include orientation and location parameters of the vehicle relative to objects located within a 360 degree field of the vehicle, and the metaphorical structures are configured to display the objects within the 360 degree field of the vehicle in a three dimensional display and to display the movement of the vehicle in the three dimensional display utilizing the angular scale of the three dimensional display.

In a more general application of this principle of the invention to an operational environment such as a vehicle, the orientation and/or location parameters include orientation and location parameters of the vehicle are represented by visual primitives forming a three dimensional display representing an externally stable frame of reference, and the metaphorical structures include a representation of the movement of the vehicle in the three dimensional display utilizing the angular scale of the three dimensional display.

In its more specific application to an aircraft, the present invention integrates all cockpit information into a single display in such a way that the pilot can clearly understand with a glance, his or her spatial orientation, flight performance, engine status and power management issues, radio aids, and the location of other air traffic, runways, weather, terrain features, waypoints, distance, wind, drag, range, and endurance, gravity effects on speed, fuel tank, rpm, engine pressure and temperature, mixture, cowl flaps, landing gear, other aircraft, multiengine procedures including engine out, Space Shuttle display and landing system, sailplane application, With the present invention, the information is presented as an integrated whole, the pilot instantaneously recognizes flight path deviations, and is instinctively drawn to the corrective maneuvers. Our laboratory studies indicate that OZ transfers to the pilot all of the integrated display information in less than 200 milliseconds. The reacquisition of scan can be accomplished just as quickly. Thus, the time constants for forming a mental model are near instantaneous. The pilot's ability to keep up with rapidly changing and threatening environments is tremendously enhanced.

Moreover, in its application to an aircraft, the invention is most easily compatible with aircraft that has flight path information coded electronically. With the correct sensors (which are currently available) the invention can be installed in essentially all current aircraft. The cost to implement the invention in existing aircraft should not be prohibitive.

BRIEF DESCRIPTION OF THE DRAWINGS AND EXHIBIT

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximations.

Exhibit A is a description of a visual information system according to the invention, and providing color illustrations similar to FIGS. 1 and 2, as well as other illustrations, to further illustrate the principles of the invention. Exhibit B includes color illustrations of FIGS. 3(A,B) and 4(A,B), as well as additional color illustrations of additional trials involving Altitude (Moderate Turbulence); Altitude (Severe Turbulence); Heading (Moderate Turbulence); and Heading (Severe Turbulence), to further illustrate the capabilities of the present invention.

DESCRIPTION OF THE PREFERRED EMBODIMENTS

OZ exploits the latest findings in visual perception as the basis for a new computer based human-centered display system. OZ resolves several central challenges of human-centered computing by providing a high bandwidth interface that presents data in a form the human user can rapidly understand, thereby facilitating effective human decision making (3). The present embodiment of OZ is an aviation flight display application, a domain in which the application of human-centered concepts can produce significant improvements in ease of use and safety. However, it will be clear to those in the art that the principles of the present invention can be applied to various operational environments (e.g. remote controlled vehicles) where rapid human centered perception of the operational environment is useful.

Piloting is divided into visual flight rules and instrument flight rules because of the obviously different skills required for flying when visual cues outside the cockpit are limited or nonexistent (9). In this case, flight information is presented to the pilot via the cockpit instrumentation. The great strength of these instruments is that they collectively provide a clear, unambiguous physical description of the aircraft's performance and its location in space. The great weakness of these instruments is that they require constant monitoring and place a substantial cognitive burden on the pilot. The scrutiny and cognitive burden these instruments impose result in control delays and contribute to human error (27). This does not have to be the case. OZ reduces the cognitive burden by exploiting recently discovered aspects of human visual perception and using these aspects to guide the design of the display to meet specific flight requirements. Thus, OZ is a human-centered computer system because it is problem-driven, activity-centered, and context-bound (3).

Scientific Basis

The development of a practical, effective human-centered computing system requires an understanding of the relevant parameters of the human user as well as of the target tasks themselves (3). Since vision is the predominant sensory modality for the present aviation application of OZ we will examine it in some detail.

The human visual system extracts, and sometimes enhances, from the visual environment, only the information most important for survival and filters out the rest. This processing of information is accomplished by both optical and neurological means and varies with retinal location. Therefore, not all visual information is equivalently processed at different locations of the visual field (26).

The scientific understanding of human peripheral visual processing has radically changed in the last 10 years and has implications for many areas of visual science. These scientific discoveries (some of which were discovered by one of the inventors), particularly about the optics of the peripheral retinal image and peripheral retinal neurophysiology (22, 23, and 28), provide insight concerning the limits of visual perception, and form part of OZ's scientific foundation. Before these new insights, it was theoretically impossible to build a display with OZ's capabilities. We used these insights to create design elements of OZ that are compatible with the optical and neurological filters of the eye and therefore reach the brain and consciousness. OZ utilizes the visual system's ability to process and transfer to the brain large amounts of information simultaneously from wide areas of the visual field.

Vision literature has dichotomized visual function into the focal and the ambient channel (peripheral vision) (11, 12, 17, 20, 24, and 25). The focal channel, emphasizing central or foveal vision, is used for tasks like reading and is associated with directed attention. Almost all existing displays are designed around the focal channel. The ambient channel, emphasizing peripheral vision, is primarily used for such tasks as locomotion that can be accomplished without conscious effort or even awareness. In the normal environment both of these channels operate simultaneously, e.g., a running quarterback can throw a pass to an individual. Past research has recognized the existence of the ambient channel, primarily from clinical data (20, 24, and 25). But, because the ambient channel was thought to have a narrow bandwidth, its utility for flight displays was, in the past, for the most part, discounted. The few displays that have attempted to use the ambient channel have been coarse and limited the information bandwidth they tried to present, consequently none of these attempts was really successful. Existing displays are designed to use the focal channel which has a wide bandwidth but which requires the sequential viewing of its display elements. The sequential nature of the viewing imposes substantial delays, high mental workload, multi-tasking and consequent division of attention. OZ was specifically designed to use the large bandwidth and simultaneous effortless processing capability of the ambient channel for tasks such as locomotion, while taking full advantage of the focal channel's ability to direct attention to tasks that demand the resolution of fine detail such as reading, targeting, etc. The successful combination of the ambient and focal channel displays into a single display makes it possible use both channels simultaneously; e.g., to view a moving map display (or any other display requiring central vision) nested within OZ while continuing to fly the aircraft with OZ. This ability to multiplex the visual system is one of the key advantages of OZ.

The remaining challenge was to discover and develop an organizational framework that provides OZ's display elements access to a broader bandwidth of peripheral vision and to integrate the information between the ambient and focal channels. Contemporary visual perceptual research provided this framework. OZ specifically uses numerous perceptual phenomena; e.g., figure-ground (2, 6, 10, and 19), pop-out (4, 7, and 8), chunking, texture (1, 2, and 13), effortless discrimination (1, 6, and 17), structure-from-motion (5, 14, and 16), etc., that enable the visual system to organize the design elements into a meaningful, quickly understood informational display.

OZ Description

Figure 1:
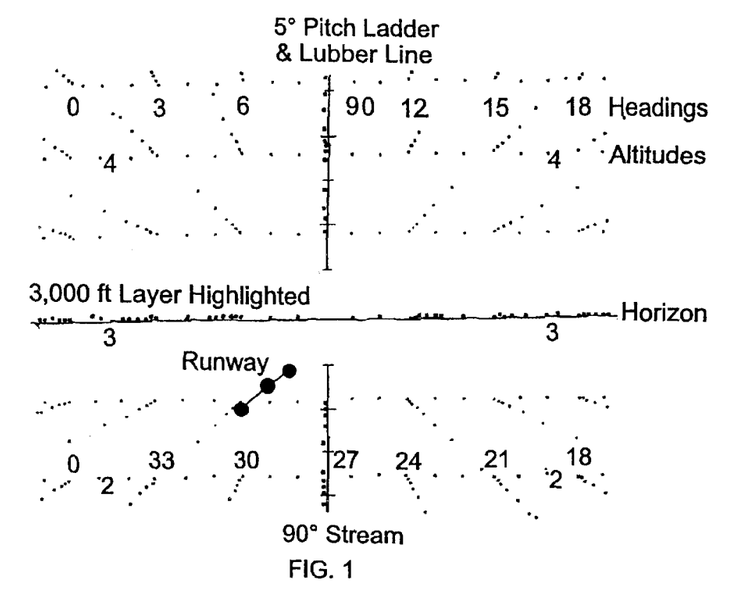
FIG. 1 is a representation of the Airspace Coordinate System.
Figure 2:
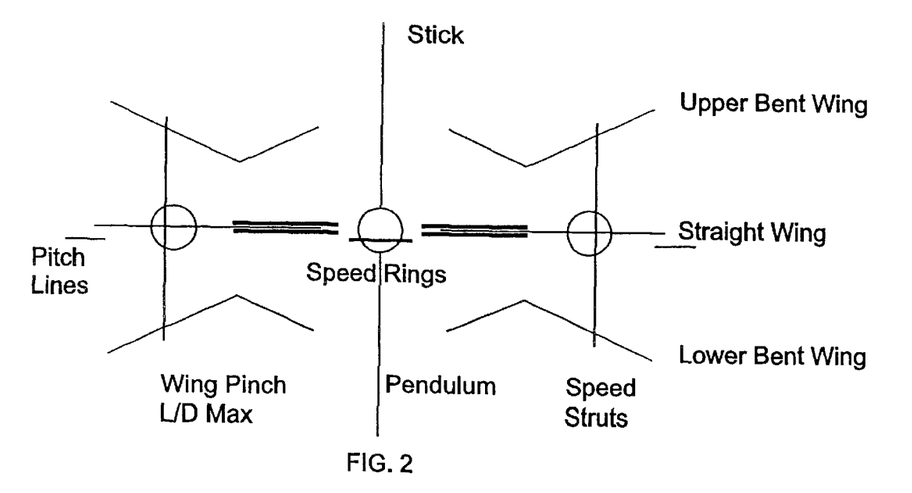
FIG. 2 is a representation of the Aircraft Metaphor.

FIGS. 1 and 2 and the illustrations of Exhibit A, provide an idea of what OZ looks like. Desktop flight simulator demonstrations are also available and provide the best possible 'reality' test.

The following description is divided into: 1) The Airspace Coordinate System describing how OZ represents airspace; 2) The Aircraft Metaphor describing how OZ represents the aircraft in the airspace, 3) Radio and Navigation Instrument Display, and 4) Other Displays embedded in OZ.

AIRSPACE COORDINATE SYSTEM

The Airspace Coordinate System is composed of perceptual primitives (lines, dots, and circles) and a few numeric labels. It relies on a Star Field metaphor to provide a mathematically rigorous visual frame of reference within which real objects can be located in three dimensional space. These objects can be airports, obstructions, waypoints, other aircraft, weather, etc. The Airspace Coordinate System provides a frame of reference that allows the incorporation of predictive displays that could show the maximum altitude that a zoom maneuver would reach or the maximum distance a glide could go.

Horizon, Lubber, and Down Lines

There are three primary lines in the Airspace Coordinate System; the Horizon, Lubber, and Down lines. The Horizon Line (FIG. 1, Marker A, see also Exhibit A) is brown line whose movement corresponds to the real horizon. The Lubber Line (FIG. 1, Marker B, see also Exhibit A) is a blue line extending perpendicularly up from the Horizon Line's midpoint. The Down Line (FIG. 1, Marker C, see also Exhibit A) is a brown line extending down from the Horizon Line's midpoint. At the external ends of the Horizon, Lubber, and Down Lines are markers to indicate bank angle. These bank indicators move in pitch with the Horizon Line. Pitch Crosses are reference lines that are drawn on the Lubber and Down Lines.

Markers on the Lubber Line and the Down Line indicate the maximum sustained angle of climb and descent the aircraft is capable of under current conditions. A Descent Angle marker on the Down line can be set to indicate a desired angle of descent. This Descent Angle marker can be an aide in making an approach to a runway or waypoint. When the runway threshold or waypoint touches the Decent Angle marker, the aircraft is at the proper position to make the selected angle of approach. To do this, the runway threshold or waypoint is centered in the Nose Ring of the Aircraft Metaphor (see below).

As an aid for emergency situations, a Glide marker on the Down Line indicates the minimum angle of the gliding descent for the aircraft's current configuration. Runways can be reached by gliding if they are at a greater angle from the horizon line than is the Glide marker. To aid in utilizing this emergency capability, Emergency Field markers can be set to indicate emergency landing sites at the first sign of engine difficulties. While on route to the nearest airport possible emergency landing sites may be marked so the pilot will know at all times if he is within gliding distance to these sites. If the engine fails entirely the aircraft can be turned to the best (within gliding distance) emergency-landing site.

Star Field

The other major component of the Airspace Coordinate System is the Star Field. The Star Field is composed of layers (FIG. 1, Marker D, see also Exhibit A) of star streams (Cornrows, FIG. 1, Marker E, see also Exhibit A) that appear to radiate from the center. The layers are located at every 500 feet of altitude. Each 1000-foot layer is labeled at both ends by its altitude in thousands of feet; i.e. 3000 feet would be labeled 3 (FIG. 1, Marker F, see also Exhibit A). The Star Field scrolls vertically as aircraft altitude changes. Over 2500 feet of altitude is shown at any given time. Altitudes normally are displayed referenced to sea level but can be set to display pressure altitude, or distance above ground level. The source of the altitude information may be barometric, radar, or Global Positioning System, etc. Additionally, a numeric indication of altitude is placed in boxes (not shown) located at the end of the Horizon Line.

The aircraft's altitude is indicated by the location of the Horizon Line in the Star Field. Additionally, layers above the aircraft's altitude are colored blue while layers at or below the aircraft's altitude are colored brown. In certain instances a layer within a set distances from the aircraft may be uniquely colored. The ground/surface layer or other altitude floor restriction (FIG. 1, Marker G) is highlighted with Cornrows every 10 degrees instead of the usual 30 degrees. Special layers may be added to highlight any altitude. These highlighted layers have larger stars.

The stars of each layer begin ½ nautical mile in front of the aircraft, thus the 500 foot vertical separation of the layers corresponds to a vertical angular separation of about 10° for the layers next to the Horizon Line. This distance to where the layers begin can be adjusted to provide different vertical field of views, e.g. a ¼ nautical mile distance would result in doubling the vertical field of view without effecting altitude holding capability. The standard horizontal separation of the Cornrows is 30°. Each Cornrow is labeled with the first two numbers of its bearing; i.e. a heading of 270° is labeled 27. Cornrows above the aircraft are labeled with bearings in front of the aircraft; Cornrows below the aircraft are labeled with bearings behind the aircraft, so the entire Compass Rose is shown. The Star Field scrolls horizontally as aircraft heading changes. These heading changes can be determined in any of several ways: magnetically, Global Positioning System, Loran etc. Heading is normally referenced from magnetic north but can be referenced to true north. The aircraft's heading falls directly under the Lubber Line. Special Cornrows may be added to highlight any selected bearing. These highlighted Cornrows are displayed with large red stars. The primary bearing's stars are open squares (like a jet intake). The reciprocal bearing's stars are crosses (like a rudder and elevator).

Runways

Runways are shown by three points, a point for each end and one for the middle and connecting these three points with straight lines. When the aircraft is on the extended runway centerline the three markers will fall as a straight line that is perpendicular to the Horizon Line. An extended runway centerline can be drawn to aid in runway alignment. If the aircraft is not on the runway centerline the three markers are not perpendicular to the Horizon Line; thus lateral drift can be detected and corrected. When this information is coupled with heading information, cross wind drift becomes evident.

Helicopter landing sites are marked somewhat differently but use the same motion parallax principle to pick up drift/translation. Helicopter landing sites are marked with two lines perpendicular to each other and parallel to the earth's surface. The crossing point of these lines indicates the exact center of the landing site. Points away from the center point are marked at regular intervals and connected by straight lines. When the pilot's eye is directly over the center the landing site the connected markers will form lines that are perpendicular to the Horizon Line. The distance of the closest marker that can be seen is an indication of altitude. The markers are coded to reflect the maximum altitude from which they can be seen when the aircraft is in a level attitude. The pilot aligns the aircraft so that its heading is the same as one of the lines. Lateral drift is detected when the markers for this line deviate from the perpendicular to the horizon line. The Pilot places the other line directly to his sides. Forward and aft drift is detected again by motion parallax of the markers. Landing/hover sites need not be limited to existing sites from a database. Additional sites can be marked by entering coordinate and altitude information or by marking the aircraft's current position. The orientation/heading of the marker lines can be from a published procedure or be set by the pilot.

Stop Watch

Two red circles in the Airspace Coordinate System are the Stopwatch (FIG. 1, Marker H). The circles travel along the Horizon Line, starting at a point that corresponds to 90° off the aircraft heading, and move, at a rate of 3° per second, toward the center of the Horizon Line, to the location that corresponds to the aircraft heading. It takes 30 seconds to complete one trip. A full 60 seconds is encoded by having the red circles fill up half way during the first 30 seconds and during the second 30 seconds they fill up completely. To time more than one minute, a number is added in the middle of the circle, to represent the number of minutes completed. The Stop Watch can either count up (for holding patterns, procedure turns) or count down (for instrument approaches, decision times). It should be pointed out that the rate the circles travel, 3 degrees per second, is designed to show if a desired heading will be reached before or after a desired time if the turn is a standard rate turn.

Wind Tetrahedron and Crosswind Outriggers

A triangular wind Tetrahedron (not illustrated) displays wind direction. The Tetrahedron pivots about its middle on the Lubber Line so that it points into the direction the wind is from. The size of the Tetrahedron reflects wind speed. Tetrahedron size is scaled so that, if the desired ground track direction is placed on the Tetrahedron's base, then the aircraft will have the correct crab angle into the wind. Thus, the size of the Tetrahedron varies with both wind speed and aircraft speed, and its angle varies with aircraft heading and wind direction.

To aid in judging crosswind for landing, two parallel Outriggers are drawn with dashed lines about the Tetrahedron's pivot point. The Outriggers rotate about the Tetrahedron's pivot point so that they remain parallel to the runway centerline. The perpendicular distance from the Outrigger midpoints to the pivot point utilizes the Tetrahedron's wind scale and indicates the maximum crosswind permissible for the aircraft. Thus, if the Tetrahedron does not touch the Outriggers the crosswind component of the wind is less than the maximum permissible for the aircraft. These relationships hold for any angle the wind makes with the runway.

One technique used for crosswind landings is to slip the aircraft to counteract wind drift. This is done by banking the aircraft into the wind while holding heading with rudder. The amount of bank is dependent on the speed of the wind's crosswind component. A Bank Guide rotates from the Lubber Line (pivoting about the center of the Horizon Line) to indicate the amount of bank required. When the Bank Guide is parallel to the Rhino Horn (discussed below) the aircraft has the correct amount of bank. The required amount of rudder is indicated when the Pendulum (discussed below) aligns with the brown Down Line. When these conditions are met the aircraft flight path will be along the extended runway centerline.

AIRCRAFT METAPHOR

The Aircraft Metaphor (AM) is a strut-braced triplane composed of circles, lines and a few numeric labels. The shape, size, location, and interplay among the aircraft components as well as with the Airspace Coordinate System encode aircraft attitude, altitude, performance, configuration, power and fuel management, and operating limitations.

Nose Ring (FIG. 2, Marker A, see also Exhibit A)

The AM is composed of several parts that move together. This joint motion unifies the several AM components into a single object, structure from motion. In the middle of the AM the Nose Ring (FIG. 2, Marker A, see also Exhibit A), a circle whose vertical location is proportional to the instantaneous glide/climb angle. The glide/climb angle is measured from the Horizon Line and shares the same angular scale as the Star Field. If the Nose Ring is centered on the Horizon Line then vertical speed is zero. The diameter of the Nose Ring can also be scaled and actively adjusted so that a vertical speed of 500 feet per minute is achieved when the Nose Ring is placed to just touch the Horizon Line. The horizontal position of the Nose Ring is proportional to rate of turn.

Dashed Lines (FIG. 2, Marker B, see also Exhibit A)

Near the Nose Ring and at either end of the Horizon Line are short horizontal Dashed Lines (FIG. 2, Marker B, see also Exhibit A). The Dashed Line's vertical location is proportional to aircraft attitude. The angular pitch of the aircraft in degrees is displayed by the relation of the Dashed Lines and the Pitch Crosses on the Lubber and Down lines as well as the Star Field. When the Dashed Line is on the Horizon the aircraft attitude is zero. This relation is scaled with the same angular scale that the Star Field uses.

Rhino Horn (FIG. 2, Marker C) & Pendulum (FIG. 2, Marker D, see also Exhibit A)

The line extending up from the Nose Ring is the Rhino Horn (FIG. 2, Marker C, see also Exhibit A). The angular (bank) and lateral (rudder) displacement of the Rhino Horn from the Lubber Line is proportional to rate of turn (needle of the needle and ball). The line descending from the Nose Ring is the Pendulum (FIG. 2, Marker D, see also Exhibit A). The angular displacement of the Pendulum is proportional to skid/slip (the ball of the needle and ball). The resulting direction of the Pendulum from this angular displacement indicates the direction of the dynamic aircraft weight (vector sum of forces on the aircraft) or $G_z$ force. The amount of $G_z$ is indicated by the shape and size of the Pendulum, thus is it a G-meter.

Autopilot & Flight Director (not shown)

A Diamond surrounding the Nose Ring indicates that the autopilot is engaged. The Diamond is drawn with dashed lines and is twice as high as it is wide and is just large enough to enclose the Nose Ring. Another purpose of the Diamond is to server as the Flight Director; that is, it directs the pilot to the correct heading and altitude. In the Flight Director mode the Diamond is drawn with solid lines. To follow the Flight Director's instructions, the pilot places the Nose Ring in the middle of the Diamond, with the Rhino Horn and Pendulum passing through the Diamond's upper and lower vertices.

Wing Structure

The AM is a triplane whose wings change configuration to display different performance parameters. In the Routine Flight Mode, Standard Rate Turn information as well as the Stall, Never Exceed, and Minimum Drag speeds are computed for the aircraft's configuration and environmental conditions. These performance parameters are graphically represented by the triplane configuration. In addition to the parts already described (Nose Ring, Dashed Lines, Rhino Horn, Pendulum) the AM triplane has three wings (one middle Straight Wing and two Gull Wings), two Wing Struts, two Speed Bugs, and two angle of Attack Diamonds.

The Middle Straight Wing (FIG. 2, Marker E, see also Exhibit A) lines up with the middle of the Nose Ring. When the Straight Wing is parallel to the Horizon Line, the aircraft is level from side to side.

The Upper and Lower wings are Gull Wings (FIG. 2, Marker F, _see also Exhibit A). When they are parallel to the Horizon Line and the aircraft is in coordinated flight (Pendulum perpendicular to the straight wing) the aircraft is executing a coordinated, standard rate turn. Since the bank angle required for a standard rate turn varies with airspeed, the angle and separation of the Gull Wings also varies with airspeed.

The Wing Struts (FIG. 2, Marker G, _see also Exhibit A) are the two vertical lines connecting the wings. The Straight Wing is color coded as an airspeed indicator. The greater the airspeed the farther outboard the Wing Struts are 'blown.' Digital indications of airspeed may be toggled on when desired and are displayed just outboard of the Wing Struts. Ground speed indications are represented by a discontinuity of the Wing Strut where it crosses the Straight Wing.

Speed Bugs (FIG. 2, Marker H, see also Exhibit A) are two circles, the size of the Nose Ring, that are placed on the Straight Wing to mark a selected speed. Furthermore, the Speed Bugs and Nose Ring also represent fuel tanks and when filled indicate full fuel. A double ring identifies the selected fuel tank. Numeric indications of fuel and fuel flow may be toggled and displayed just outboard of the Speed Bugs.

Oil temperature and pressure indicator Collars (not shown) surround the Speed Bugs. These Collars start at the bottom of the Speed Bugs and wrap up and around the Speed Bugs to their mid-point. When the Collar is between one third and one half the way up the Speed bug the represented values are nominal. Above the mid-point the Collars stop following the contour of the Speed Bugs and continue up vertically to represent values that are notably above the nominal normal values. The Collars turn away from the Speed Bugs if the values become critically high.

Cylinder temperatures (piston aircraft) are displayed by the Cylinder Temperature Polygon positioned within a Speed Bug. Each vertex of the Polygon corresponds to an individual cylinder of a piston aircraft. When the temperatures are in the nominal range the Vertices are within the circle of the Speed Bug.

The sides of the Polygon represent the Cowl Flaps. If the sides are continuous then the Cowl Flaps are closed. As the Cowl Flaps open so do the sides of the Polygon.

Landing Gear wheels are circles located at the ends of the wing struts and when present indicate that the landing gear is lowered.

When the Wing Struts are outboard, at the wing tips, the aircraft is at its maximal structural speed. When the Wing Struts are at the wing roots the Aircraft is at its stalling speed. Note that this stall speed is not merely the aircraft's unaccelerated stalling speed. The position of the Wing roots varies with aircraft acceleration to reflect the effect on stalling speed. As stalling speed increases the root ends of upper and lower wings changes from a solid line to a dotted line, the root end of the solid portion corresponds to the stalling speed under present conditions while the root end of the dotted portion corresponds to the unaccelerated stalling speed. Since these speeds vary with aircraft configuration (flaps, wing tilt, wing sweep, etc.) the length of the wings also varies. The wings indicate a third important speed; the point where the Gull Wings pinch together corresponds to either minimum drag speed (FIG. 2, Marker I) or best rate of climb or best angle of climb depending on engine operation and type. With engine failure the minimum drag speed is shown to provides the maximum glide. For propeller aircraft best rate or climb may not occur at minimum drag speed due to propeller and engine efficiency issues so the Gull Wing Pinch corresponds to best rate of climb. For jet aircraft minimum drag speed is shown and corresponds to maximum angle of climb. Thus, for the proper control of the aircraft, pilots must know the minimum drag speed of the aircraft for various conditions. Speeds other than the minimum drag speed result in greater drag. Speed is dynamically stable at speeds faster than minimum drag speed because the faster the aircraft, the more power required; thus, if power is constant and speed is momentarily increased, the aircraft will slow to return to its original speed. Conversely, if the aircraft is momentarily slowed, it will experience less drag and increase its speed. However, when the aircraft is operating below its minimum drag speed, speed is unstable. In this range, if the aircraft is momentarily slowed it will slow even farther. Operating at less than minimum drag speed is referred to as 'being behind the power curve,' and is a significant cause of general aviation accidents. Minimum drag speed varies with aircraft configuration and is not indicated on conventional instruments; instead, memorized approach speed gates are utilized to avoid this dangerous portion of the operating envelope.

Flap Display: Flap position is displayed by recalculating, maximum speed, minimum drag speed and stall speed, and resealing the Gull Wings to display these speeds; thus the pinch in the Gull Wings shifts. When flaps are added the pinch, wing tips and struts move inboard.

Angle of Attack Displays: Angle of attack refers to the angle between the wing and the passing air and is measured in degrees. For a given aircraft weight and angle of attack there is only one airspeed at which the aircraft can maintain a given glide/climb angle and steady airspeed. The angular difference in the vertical location of the center of the Nose Ring and the Dashed Line Pitch Indicator corresponds to angle of attack for wings level. One way OZ displays angle of attack is with Attack Diamonds. The four Attack Diamonds travel laterally on either side of and parallel to the mid-wing, a pair of diamonds on either side of the nose ring. The lateral position of the Attack Diamonds corresponds to the airspeed produced with the given angle of attack for level flight. The vertical separation of the Attack Diamonds from the Mid-Wing is adjusted so that the ideal approach angle of attack is indicated when the Attack Diamonds cross the roots of the Gull Wings. Since angle of attack can change almost instantly and changes of airspeed require overcoming the inertial of the aircraft, the Attack Diamonds are essentially predictors of the airspeed (Wing Struts) at which the aircraft will settle. These display elements allow angle of attack approaches to be flown while maintaining a sense of airspeed. Furthermore, when the angle of attack and airspeed do not agree, the cause can be sought; for example, if the aircraft is icing, the Wing Struts and Attack Diamonds will not align in stable flight (the Wing Struts will stabilize outboard of the Attack Diamonds in level flight).

A third way angle of attack is displayed is with a line mapping out the airspeed and vertical speed combinations that can be obtained at the present angle of attack. Where this line intersects the Gull Wings represents the speed for level flight with the current angle of attack. Thus the stability of the current flight parameters can be assess at other than straight and level flight. A marker Ball is added to show the combination of airspeed, vertical speed and power at which the aircraft will eventually stabilize if the current attitude and power are maintained.

The Wing Struts, in combination with the Gull Wings, provide power management information. The length of the Wing Strut is proportional to the amount of thrust available and varies with altitude, engine power, and propeller efficiency. The portion of the Wing Strut that is colored green represents the proportion of available thrust being used. Available thrust that is not being used is colored purple. The display is scaled so that when the thrust used (green) just reaches the Gull Wings the thrust is correct to maintain the aircraft at its present configuration, weight, altitude, and airspeed). If the thrust used (green) goes beyond the Gull Wings then the aircraft will increase airspeed or altitude or both. Conversely if the thrust used does not reach the Gull wings, the aircraft cannot maintain its present airspeed or altitude. On a single engine aircraft both Wing Struts represent the single engine. On twin engine aircraft, each engine would be shown by one of the two Wing Struts. Additional Wing Struts are added for additional engines. In emergency engine loss situations, OZ automatically indicates the lost engine (strut becomes broken) and the thrust of the remaining good engines is display, scaled to the new situation. For multi-engine aircraft that lose an engine several immediate actions must be accomplished immediately to maximize performance. The airspeed must be maintained above specific values, the failed engine must be identified, the aircraft must be precisely banked away from the failed engine, and rudder must be applied to keep the aircraft pointed directly into the relative wind. OZ in addition to indicating the performance that can be expected for the given conditions, shows which engine failed, the minimum airspeed required, and the required bank. This is done by adjustments in the Wing Struts, Speed Bugs, Rhino Horn and Pendulum. In this way the pilot is informed immediately which engine is out and if enough thrust remains to sustain flight. Power setting bugs can be set on the Wing Struts to mark desired power settings. In addition to marking a certain per cent power setting (i.e. 65%) additional bugs can be placed to indicate power required for 500-fpm climbs or descents at the current airspeed.

Engine speed and Manifold pressure displays: Flanking each Wing Strut are indicators of engine speed (revolutions per minute, rpm) and manifold pressure (mp). These two indicators form a pair of indicator lines sandwiching each Wing Strut. These pairs of indicators are scaled such that a line connecting their respective levels, the Thrust Line, passes directly through the green end of the respective Wing Strut. Thus, if the rpm is to be reduced while maintaining the same level of thrust, the pilot increases mp so that the Thrust Line still pivots at the same location on the Wing Strut.

Engine gas temperature indicator: Adjacent to and outboard of these indicators is the engine gas temperature indicator. In a piston engine aircraft engine gas temperature is used to adjust the fuel/air ratio, commonly called the mixture. As the fuel/air ratio decreases from its maximum possible value the exhaust gas temperature first increases and then decreases. Maximum power is produced with exhaust gas temperatures lower and the mixture richer than at peak. Maximum economy is achieved when the exhaust gas temperatures again are lower than peak but the mixture is leaner than at peak. Thus, the pilot needs to know the peak temperature and whether it is on the lean or rich side of the peak. The engine gas temperature indicator is an inverted 'U'-shaped curve with the vertical dimension corresponding to temperature, hottest at the top.

The engine gas temperature display portion of OZ is automatically activated when the mixture is adjusted or when it is selected. The display can also be horizontally collapsed to conserve space. The outboard side of the 'U' is the richer than peak. The vertical temperature dimension is scaled so that the vertical movement of the temperature indicator corresponds to the resulting change in the thrust indication of the Wing Strut. The temperature corresponding to peak power is at the top of the 'U'. The location of the top of the 'U' varies while the ends of the 'U' are fixed. Thus, the length of the arms of the 'U' varies as the peak power temperature changes and both relative and absolute information are show. The scale is such that vertical changes correspond to thrust changes. The width of the 'U' can be adjusted to provide adequate temperature resolution. The pilot may set the peak power setting values in flight for current conditions and the display will rescale from these values or the display may work from a database. Multiple cylinders can be displayed with multiple 'U' lines. When flight conditions change and the existing gas temperature is not optimal (incorrect mixture) the temperature will no longer be at the top of the 'U.'

Fuel flow is another inverted 'U'-shaped display nested below the temperature 'U'. The Fuel flow scale runs with inboard being the lowest and outboard being the highest. Expected Fuel flow for the current engine setting are set at the peak of the 'U.° Freezing temperature in the carburetor are indicated by filling in the space between the 'Us' with sparse dots. Carburetor ice is indicated by coloring this space a solid white, and the application of Carburetor heat is indicated by red. If ice is present and heat is on then alternating red and white stripes are displayed (barber pole) if heat alone is present then solid red is shown. In addition the green (thrust utilized) portion of the Wing Strut does not reach the Thrust Line. This can be due several factors such as Carburetor Ice, Carburetor Heat, faulty ignition, blocked air filter, etc.

Other Modes of Aircraft Performance Modeling

Power Management Mode Model: In this mode the range of aircraft performance is of primary importance while the issues like rate of turn are secondary. To this end, the Gull Wings are changed from first approximations of the aircraft's drag curve to true curvilinear images. The angle and separation of the Gull Wings and the length of the Wing Strut do not change with airspeed. This allows the pilot to compare directly power requirements at different airspeeds. Addition drag curves may be added above and below the level flight drag line in 500 feet per minute increments or the additional drag curves can be displayed to show different angle of climb or decent.

Two angle of attack lines are added; the first displays the aircraft's Stall angle of attack and the second displays the aircraft's current angle of attack. The horizontal position of the Stall Angle of Attack line varies with the dynamic weight of the aircraft (increased airspeed with increasing dynamic weight) and defines the slow end of the speed envelope. The Aircraft's never exceed speed is marked with a vertical red line and defines the high-speed end of the flight envelope. The shape of the drag curve dynamically changes with weight (both static and dynamic), altitude, temperature, and configuration. Thus the display provides the pilot with the entire possible flight envelope and the dynamically stable combinations of power, airspeed, and vertical speed possible at the current angle of attack. The pilot can adjust power and angle of attack to achieve a specific vertical speed and airspeed since the display provides the leading indicators (angle of attack, power) of where the aircraft will settle out.

This mode enables the pilot to evaluate on one set of wings, the impact on aircraft performance of changes in aircraft configuration (changes in flaps, weight, etc.) before implementing the changes.

Efficiency Mode Model: this mode reshapes the wings to display range against air speed as an endurance by speed graph. Points can be marked with a Cloverleaf and carried back to the other modes as target values enabling 'what if' configurations to be tried without actually reconfiguring the aircraft.

Pre Takeoff Mode: this additional mode for the display enables testing engine performance, fuel flow, mixture, etc. before the flight and determining ground run and obstacle clearance characteristics. Parameters, especially static weight, can be varied to evaluate their effect. Before flight, actual parameters such as weight, flaps, engine power, etc. can be compared by OZ with the know information about the airport and weather conditions to evaluate performance.

Radios

OZ integrates radio frequencies, navigation settings (i.e. Omni and ADF Bearing Selectors) and navigation information with the addition of lines and digital markers. OZ enables the pilot to tune radios while maintaining flight instrument awareness. Frequency Displays, Automatic Direction Finders (ADF), Very High Frequency Omni Ranges (VOR), Distance Measuring Equipment (DME), Global Positioning System (GPS), Loran, and waypoints will be discussed first. Later the Instrument Landing System components are described.

Communication Radio frequencies are displayed, when toggled on or while tuning, at either the center of the screen, or either at the physical location of the transmitter in the world displayed by the Airspace Coordinate System. Frequencies from any radio may be toggled on in the center of the screen. Tuning itself is by either a context sensitive list or by manual entry.

The ADF display consists of a vertical red line, the ADF Line, with the bearing to the station displayed on it. The station's frequency can be toggled on below the bearing. The ADF Line extends perpendicularly up from the Horizon Line if the station is in front of the aircraft and down if the station is behind the aircraft. The ADF Line's position along the horizon line corresponds to its bearing from the aircraft's heading.

The VOR course deviation indicator (CDI) is a red vertical line perpendicular from the Horizon Line. The selected VOR radial is displayed in the top third of the line and to/from triangles are located above and below the radial respectively. The station's frequency and identifier can be toggled on below the to/from triangles. When the CDI is left of the Lubber Line, the VOR radial is to the left of the aircraft's position. Full CDI deflection places the CDI at the pinch of the Gull Wings. An alternative VOR deviation scale has the red vertical VOR Line's deviation equal to the tracking error. Thus, if the aircraft was heading outbound from the VOR station on the 90° radial, the VOR Line would be place in the Star Field over the 90° bearing with a FROM flag. On the other hand if the aircraft was headed toward the station but on the 90° radial, the VOR Line would be placed in the Star Field over the 270° bearing with a TO flag. The for navigation triangulation the VOR Line can be fixed to the FROM condition.

The location of the DME station is mapped in the Airspace Coordinate System; the distance to the station and station frequency can be toggled on below the DME location. To fly a DME arc the station is kept on the wing tip (90° Bearing) when at the appropriate distance. A central, discontinuous portion of the Wing Struts can be driven by DME ground speed information, (or other ground speed sources, such as a. GPS), so that airspeed and ground speed are simultaneously displayed. Display of digital ground speed can be toggle on and is displayed just outboard of the Wing Struts.

Waypoints (i.e. RNAV, GPS, Loran) are mapped (latitude, longitude, desired altitude) in the Airspace Coordinate System and are represented by inverted 'V' or circles. Distance encoding of waypoints is accomplished by symbol complexity and/or numeric markers. The closer the waypoint or object the greater the detail of the object becomes evident. For example, the location of another aircraft at great distances is circled but the aircraft not drawn. As the distance to the aircraft decrease to maximum detectable visual range the aircraft is shown as a dot within the circle. At closer range wings and tail may appear.

Runways, as mentioned earlier, are mapped in the Airspace Coordinate System and are represented by three dots connected by line segments. The dots represent the ends and middle of the runway. General aviation visual flight rules traffic patterns (i.e. down wind, base, final) are easily flow with OZ using these runway markers alone.

Instrument Landing System (ILS) Mode: When OZ is switched to its Instrument Landing System (ILS) mode several changes take place. The Horizon Line's color is changed from brown to magenta (to show ILS mode is active), glide slope and localizer indicators are displayed, and the Speed Bugs are replaced with Marker Bugs.

Marker Bugs are circles placed along the Straight Wing. These circles provide information on marker beacon passage, appropriate approach speed, flap settings, and the required vertical speed to maintain glide slope. Outboard blue circles represent the outer marker beacon, the middle yellow circles represents the middle marker beacon, and the most inboard white circles represents the inner marker beacon. Upon passing a marker beacon the Marker Bugs become and remain filled with their corresponding color.

The Marker Bugs' placement along the Straight Wing indicates the maximum speed the aircraft should have when passing the corresponding marker beacon. That is, the Wing Struts should be at or inboard of the corresponding Marker Bugs when that marker beacon is passed. The relationship between the Marker Bugs and the Gull Wing pinch indicates flap position. At zero flaps the Gull Wing pinch aligns with the center of the middle Marker Bug. At 10° flaps the Gull Wing pinch aligns between the middle and inner Marker Bugs. At 20° flaps the Gull Wing pinch aligns with the inner Marker Bug. At 30° flaps the Gull wing pinch aligns inboard of inner Marker Bugs.

The vertical speed required to remain on a glide slope varies with the angle of the glide slope and the ground speed of the aircraft. For example, a 3°-glide slope requires a vertical speed of about 500 fpm for a ground speed of 100 knots and 250 fpm for 50 knots. Since the Marker Bugs are centered on the Straight Wing the distance of their centers from the Horizon Line is proportional to vertical speed. OZ determines the required vertical speed and constantly adjusts the diameter of the Marker Bugs so that when the tops of the Marker Bugs just touch the Horizon Line, the aircraft is at the correct vertical speed. Thus, regardless of the changes in speed requirements to complete the task, the visual task of the pilot remains unchanged.

The glide slope is indicated by a special altitude layer marked by 'Xs' rather than points. The altitude displayed by these 'Xs' is the altitude of the glide slope at the aircraft's position. If the aircraft is above glide slope then the Horizon Line (aircraft altitude) will be above the glide slope layer. A unique feature of OZ is that it guides the pilot to smoothly recover the glide slope. If the pilot aligns the tops of the Marker Bugs with the glide slope layer the vertical speed will be increased beyond that required to maintain the glide slope angle. As the glide slope layer approaches the Horizon Line the increase in vertical speed will be reduced. When the glide slope layer is back on the Horizon Line the vertical speed is the amount required to stay on glide slope. This self correcting feature of OZ is also evident on altitude transitions and heading changes. OZ routinely guides the pilot back into 'the grove.'

The localizer is a vertical red line that remains perpendicular to the Horizon Line. When the localizer line is left of the Lubber Line then the extended runway center line is left of the aircraft. Full deflection of the localizer is at the Gull Wings pinch. . When the localizer is outside of range but turned on it is located at the Gull Wings pinch (see Gull Wing Pitch discussed above in triplane description) but colored blue. The runway heading is displayed as a red highlighted bearing. If the red localizer line is to the left of the Lubber Line and the red highlighted runway heading is to the right of the Lubber Line the aircraft is converging on the extended runway centerline. The pilot's task is to keep the Lubber Line between the 'reds' (localizer and runway heading). If both reds are on the same side of the Lubber Line then the aircraft is straying away from course. The Stop Watch can be set for either count down or count up mode to perform a timed approach, and special altitude layer may be added to cue decision height.

Embedded Displays

In pilot studies (see Appendix, Preliminary Data), the ability to read text while flying OZ was demonstrated. In fact, flight performance (altitude and heading accuracy) were not decreased by the addition of the reading task and were better than conventional instruments when flying in turbulence. The advantage of OZ over conventional instruments is due to OZ's ability to present much of its information via the ambient visual channel, freeing up the focal visual channel for other tasks. Additionally, a substantial portion of OZ's display may be obscured without reducing flight performance because the information is distributed throughout the total display. Thus, it is possible to embed other displays within OZ without reducing flight performance. Checklists, airport information, radio frequency lists, approach plates, moving maps, and weather maps could be viewed while simultaneously flying the aircraft with OZ. Targetable radar and video display could not only be viewed but their relative location in the OZ display would indicated their direction of view relative to the aircraft's centerline.

OZ replaces conventional flight instruments, radio aids to navigation, power management, fuel and flap indicators, and more. OZ's design was based on the normal operating characteristics of human vision, capitalizing on what the human visual system evolved to see best, quickest, and easiest. Therefore, OZ presents the information in a way that is ecologically most meaningful, natural, efficiently processed and understood. The result is that OZ transfers information at an extremely rapid rate; transfer of all flight parameters to the brain occurs within 200 milliseconds. In addition, our laboratory studies suggest that OZ enables the pilot to fly the aircraft without reducing flight performance while simultaneously attending to ancillary informational displays, such as radar, moving maps, and checklists. This characteristic of OZ is consistent with our other observations that flight performance with OZ is unimpaired by severe turbulence, the loss of central vision (e.g. from laser damage), or substantial optical blur as can occur when loosing glasses or contact lenses. No other display can do these things.

The principles that underlie OZ design have many applications. Among the locomotion applications are general aviation aircraft, remotely piloted aircraft and submersibles, air superiority fighters, and spacecraft. OZ's power management and drag display components make it especially suited for craft with changing flight envelopes such as variable sweep wings (F-14), tilt-rotor (V-22), and directed thrust (AV-8B).

Having described the invention, the following examples are given to illustrate specific applications of the invention including the best mode now known to perform the invention. These specific examples are not intended to limit the scope of the invention described in this application.

Embodiment of OZ

Oz is designed to be displayed on existing 'Glass Cockpit' hardware. "Glass Cockpit" hardware means a system comprising an information display, processing system, and sensors providing the sensed parameters. It can therefore be retrofitted into existing aircraft with a change in display software. For aircraft with traditional mechanical display, glass cockpit hardware may be installed into the aircraft for the OZ display. The development version of OZ is running on Pentium based consumer grade computer system running VGA graphics. The OZ code is written in a DOS environment using Borlan $C^{++}$ programming language. The specific language, operating systems, computer system, and graphical system are not critical and OZ can be accomplished by several different means given the objectives of this application.

V. Impact and Summary

The OZ proof of concept prototype demonstrates significant improvements in flight performance while decreasing pilot workload. OZ reduces the time and mental effort required for a pilot to understand what the aircraft is doing. This faster and easier understanding allows the pilot to maintain safe control of the aircraft in emergency situations that conventional instruments would not. OZ's representation of the interaction between power, drag, and airspeed greatly reduces the likelihood of stall-spin mishaps. OZ reduces the requirements to memorize aircraft specific performance numbers, thus facilitating the safe transition of pilots between aircraft types. OZ can be elaborated to incorporate all of the instruments, gauges, radio-aids to navigation, weather, and terrain indicators that currently clutter aircraft cockpits.

Preliminary Data

Figure 3A:
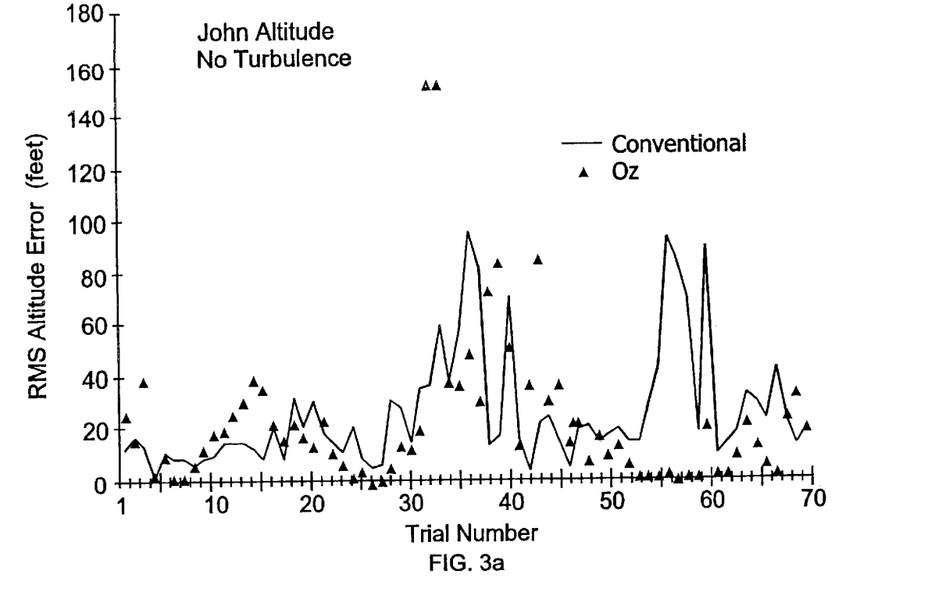
FIG. 3A is a graph of test results of Altitude No Turbulence of a first trial.
Figure 3B:
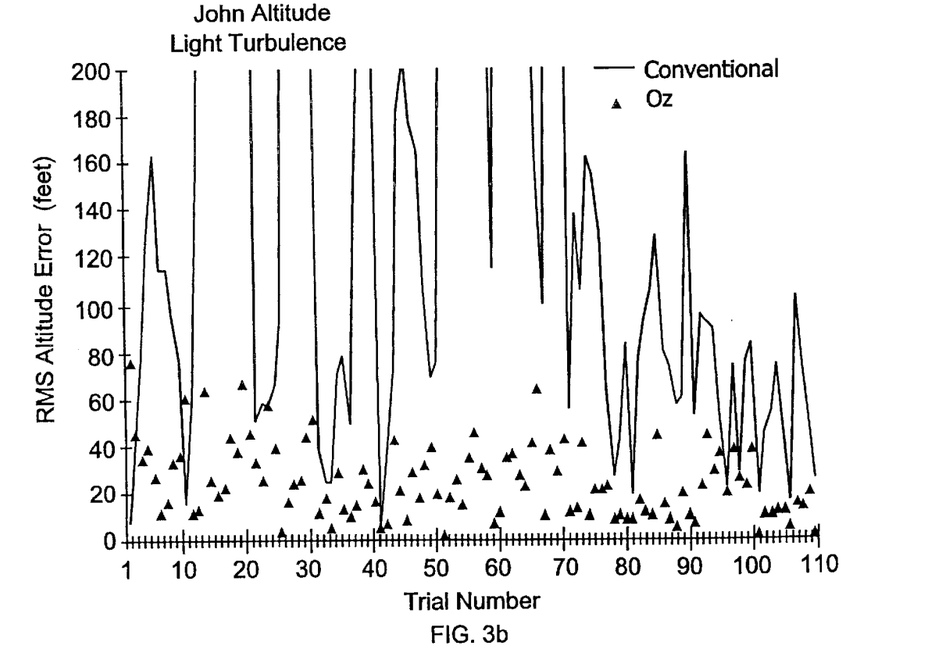
FIG. 3B is a graph of test results of Heading No Turbulence of a first trial.

A pilot experiment was performed to assess the feasibility and hardware requirements of OZ. Data were collected for straight and level flight from two naive subjects neither of whom had any flight experience. What follows is a set of sample data obtained from one subject; the results of the other subject were identical. The subjects began flying without turbulence and progressed through light, moderate, and severe turbulence (graph FIGS. 3A & 3B). Flight time with OZ and conventional instruments were interleaved; that is, subjects would fly on one display for about 4 minutes and then fly about 4 minutes on the other display. Four minutes equals 10 trials as displayed on the graph's x-axis. The subjects would continue alternating between the displays for about 1 to 2 hours. Notice that the flight performance error score on the y-axis is truncated. The RMS Heading Error label (degrees ×10) indicates that the Heading Error is displayed 10 times greater than measured. That is a measured RMS Heading error of 3° would be graphed as 30. This is a consequence of the original data collection instrumentation and procedures. Error scores with conventional instruments routinely exceeded the y-axis maximum. This never occurred with OZ.

Figure 4A:
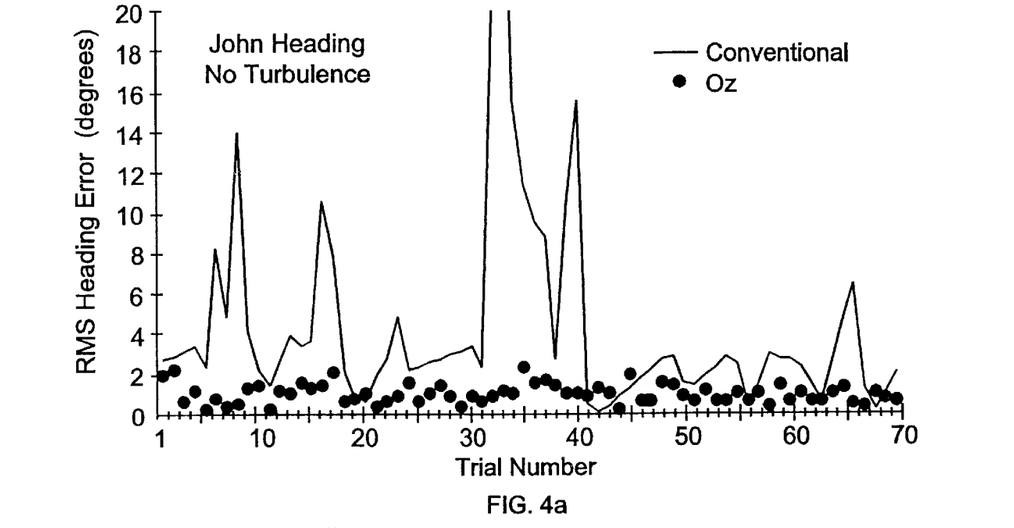
FIG. 4A is a graph of test results of Altitude Light Turbulence of a second trial.
Figure 4B:
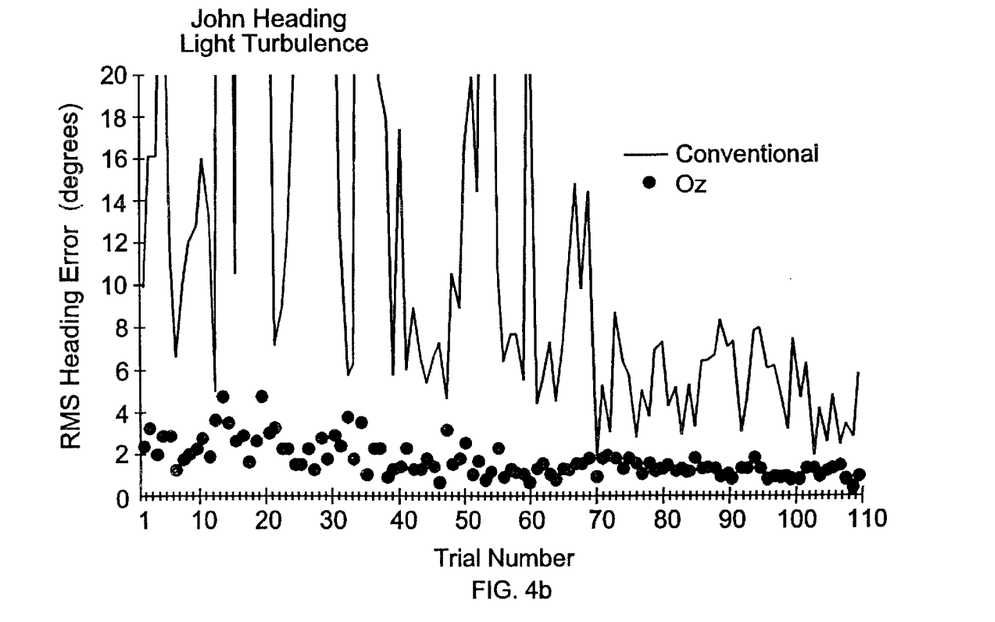
FIG. 4B is a graph of test results of Heading Light Turbulence of a second trial.

The next set of graphs (FIGS. 4A & 4B) replots these data to show the relationship between the two flight performance measures (heading and altitude RMS errors). The closer a point is to the origin the better the flight performance. OZ clearly has less overall error than conventional instruments.

After completing this learning sequence, the subjects participated in a duel tasking experiment. In this experiment subjects were required to fly with OZ while reading text which was embedded in the display. The text was presented one word at a time at a rate of one word per second and had to be read aloud. Measurements of flight performance using conventional instruments and OZ without reading were interleaved with this new task. Data were collected for all four levels of turbulence and these results are shown on graph pages 6 and 7. Note that flight performance with OZ did not decrease with the addition of the reading task. On the other hand, it should be emphasized that the subjects could not fly with conventional instruments and read at the same time. More importantly, flight performance with OZ was better than flight performance with conventional instruments even when the subjects were additionally tasked with reading while flying OZ. This demonstrates that OZ can support duel tasking without reducing flight performance.

OZ is expected to cost about the same as the instrumentation it replaces.

Additional Comments

As seen from the foregoing description, OZ conveys sampled parameters and the underling model of how these parameters interact with visual primitives and metaphorical structures. These structures' power to transmit large amounts of information is increased because their informational content can be understood across the visual field.

As will be appreciated by those in the art, with OZ, all parameters are encoded in the dimensions of the perceptual primitives that form the metaphorical structures. Moreover, the underling models of system behavior and algorithms by which parameters are displayed are encoded in the shape and interaction of the metaphorical structures. Thus, OZ is especially useful to understand situations that involve multiple data streams whose interaction is dictated by understood mechanisms.

In aircraft, many different data streams are involved and the rules governing their interactions are well understood. The drag curve of the aircraft for example dictates how airspeed, aircraft configuration, altitude, temperature, and engine output interact to effect performance. OZ transforms this knowledge of interaction into the structural appearance and interaction of its metaphors, specifically the Bent Wings and the Wing Struts. This can also be done for other relationships such as Range and Endurance. For example, referring to the drag curve and airspeed struts of FIG. 2 and also shown in Exhibit A, when the visual primitives representing the metaphorical structure for the sensed airspeed is configured to interact with (and in FIG. 2 overlays) the metaphorical structure for the drag curve a pilot, or someone controlling the aircraft remotely, is provided instantly with a visual image that will alert the operator to the craft approaching or entering a dangerous flying condition, and will also allow the operator to quickly visualize when the aircraft is staying away from that dangerous flying condition.

In medical or anesthesia monitorying, again we have a situation where many data streams interact following known rules to produce an outcome. Here, the interaction between patient physiology, effects of drugs, effects of surgical procedures, can be shown and compared to expected or normal values, and thereby evaluate overall patient status. The physical appearance of this type of display would be totally different than the OZ display of the attached drawings but would follow the same principles of indicating measured and reference parameters in perceptual primitives and underlying rules of parameter interaction with the structure and interaction of the metaphors.

Obviously, many modifications and variations of the present invention are possible in light of the above teachings. It is therefore to be understood that, within the scope of the appended claims, the invention may be practiced otherwise than as specifically described.

VII. References

1. Bergen, J. R.: Theories of visual texture perception. In: *Spatial Vision*. Ed. David Regan, Vol. 10, Vision and Visual Dysfunction General Editor J. R. Cronley-Dillon. CRC Press., Inc., Boca Raton, 1991, 71–92.
2. Capote, G.: The role of the background: texture segregation and figure-ground segmentation. Vision Res 1996 September; 36(18): 2815–2826.
3. Flanagan, J. L., Huang, T. S., Jones, P. and Kasif, S.: Final Report of the National Science Foundation Workshop on Human-Centered Systems: Information, Interactively, and Intelligence (HCS)., Hosted by Beckman Institute for Advanced Science and Technology, University of Illinois at Urbana-Champaign July, 1997 Arlington, Va.
4. Goodenough, B., Gillam, B.: Gradients as visual primitives. J Exp Psychol Hum Percept Perform 1997 April; 23(2):370–387.
5. Hogervorst, M. A., Kappers, A. M., Koenderink, J. J.: Structure from motion: a tolerance analysis. Percept Psychophys 1996 April; 58(3):449–459.
6. Julesz, B.: Figure and ground perception in briefly presented isodipole textures. In: Perceptual Organization, Eds.: M. Kubovy and J. Pomerantz, Lawrence Erlbaum Associates, Hillsdale, N.J. 1981.
7. Julesz, B., Caelli, T.: On the limits of Fourier decompostitions in visual texture perception. Perception 1979;8(1):69–73.
8. Kastner, S., Nothdurft, H. C., Pigarev, I. N.: Neuronal correlates of pop-out in cat striate cortex. Vision Res 1997 February; 37(4):371–376.
9. Kershner, W. K.: The Instrument Flight Manual (4th Edition) Iowa State University Press/Ames. 1991.
10. Lamme, V. A.: The neurophysiology of figure-ground segregation in primary visual cortex. J Neurosci 1995 February; 15(2):1605–1615.
11. Leibowitz, H.: Post, R. B.: Two modes of processing concept and some implications. In: Organization and Representation in Perception. Ed.: J. Beck, Erlbaum, 1982.
12. Leibowitz, H., Shupert, C. L.: Low luminance and spatial orientation: In Proceedings of the Tri-Service Aeromedical Research Panel Fall Technical Meeting, Naval Aerospace Medical Research Laboratory, Pensacola, Fla.; NAMRL Monograph-33, 1984, 97–104.
13. Leonards, U., Singer, W., Fahle, M.: The influence of temporal phase differences on texture segmentation. Vision Res 1996 September; 36(17):2689–2697.
14. Lind, M.: Perceiving motion and rigid structure from optic flow: a combined weak-perspective and polar-perspective approach. Percept Psychophys 1996 October; 58(7): 1085–1102.
15. Naval Air Training Command, Flight Training Instruction TH-57, Helicopter Advanced Phase, CNATRA P_457 New(08–93) PAT; NAS Corpus Christi, Tex., 1993.
16. Pollick, F. E.: The perception of motion and structure in structure-from-motion: comparisons of affine and Euclidean formulations. Vision Res. 1997 February; 37(4): 447–466.
17. Post, R. B., Leibowitz, H.,W.: Two modes of processing visual information: implications for assessing visual impairment. Am J Optom Physiol Opt 1986 February; 63(2): 94–96.
18. Senders, J.: Visual Scanning Processes, 1980. Available from J. Senders, University of Toronto.
19. Siddiqi, K., Tresness, K. J., Kimia, B. B.: Parts of visual form: psychophysical aspects. Perception 1996; 25(4): 399–424.
20. Simoneau, G. G., Leibowitz, H. W., Ulbrecht, J. S., Tyrrell, R. A., Cavanagh, P. R.: The effects of visual factors and head orientation on postural steadiness in women 55 to 70 years of age. J Gerontol 1992 September; 47(5) M151–M158.
21. Temme, L. A., Woodall, J., Still, D. L.: Calculating A Helicopter Pilot's Instrument Scan Patters From Discrete 60 Hz Measures Of The Line-Of-Sight: The Evaluation Of An Algorithm. Paper in Review.
22. Thibos, L. N., Still, D. L., Bradley, A.: Characterization of Spatial aliasing and contrast sensitivity in peripheral vision. Vision Research, 36, 249–258, 1996.
23. Thibos, L. N., Bradley, A.: Modeling off-axis vision-II: The effects of spatial filtering and sampling by retinal neurons. In Vision Models for Target Detection and Recognition: World Scientific Press, Singapore, 1995.
24. Turano, K., Herdman S. J., Dagnelie, G.: Visual stabilization of posture in retinitis pigmentosa and in artificially restricted visual fields. Invest Ophthalmol Vis Sci 1993 September; 34(10): 3004–3010.
25. Wade, M. G., Jones, G.: The role of vision and spatial orientation in the maintenance of posture. Phys Ther 1997 June; 77(6): 619–628.
26. Wertheim, T.: Peripheral visual acuity (1894). Translated by Dunsky IL Am J Optom Physiol Opt 1980 57: 919–924.
27. Wickens, C. W.: The effects of control dynamics on performance. Chapter 39; In: The Handbook of Perception and Human Performance, Eds.: K. Boff, L Kaufman, and J. Thomas; 1986; John Wiley and Sons, N.Y.
28. Williams, D. R., Coletta, N.J.: Cone spacing and the visual resolution limit. Journal of the Optical Society of America, A, 4, 1514–1523 1988.

What is claimed is:

1. In a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein the vehicle is an aircraft, said visual display is configured to be at least partially within a viewer's peripheral vision field, and at least part of the operational parameters are conveyed by perceptual primitives within the viewer's peripheral vision field, and the operational parameters include the drag curve for the aircraft and the airspeed of the aircraft.

2. In a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field, and wherein said location and orientation parameters include a three dimensional star field metaphor which is at least partially within a viewer's peripheral vision field.

3. In a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field, wherein the orientation and location parameters include orientation and location parameters of the vehicle relative to objects located within a 360 degree field of the vehicle, and wherein the metaphorical structures are configured to display the objects within the 360 degree field of the vehicle in a three dimensional display and to display the movement of the vehicle and the movement of the objects in the three dimensional display utilizing the angular scale of the three dimensional display.

4. In a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field wherein the orientation and location parameters are represented by visual primitives forming a three dimensional display representing an externally stable frame of reference, and wherein the metaphorical structures include a representation of the movement of the vehicle in the three dimensional display utilizing the angular scale of the three dimensional display.

5. Apparatus comprising an informational display for use in controlling a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field, and wherein said location and orientation parameters include a three dimensional star field metaphor which is at least partially within a viewer's peripheral vision field.

6. Apparatus comprising an informational display for use in controlling a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field, wherein the orientation and location parameters include orientation and location parameters of the vehicle relative to objects located within a 360 degree field of the vehicle, and wherein the metaphorical structures are configured to display the objects within the 360 degree field of the vehicle in a three dimensional display and to display the movement of the vehicle and the movement of the objects in the three dimensional display utilizing the angular scale of the three dimensional display.

7. Apparatus comprising an informational display for use in controlling a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearance, location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein said visual display is configured to be at least partially within a viewer's peripheral vision field, and at least part of the operational parameters are conveyed by perceptual primitives within the viewer's peripheral vision field, wherein the orientation and location parameters are represented by visual primitives forming a three dimensional display representing an externally stable frame of reference, and wherein the metaphorical structures include a representation of the movement of the vehicle in the three dimensional display utilizing the angular scale of the three dimensional display.

8. Apparatus comprising an informational display for use in controlling a vehicle in which a sensing system is configured to sense orientation and location parameters of the vehicle and a plurality of operational parameters of the vehicle, and a processing system is configured to process the sensed parameters for display on a visual display, an improved visual display configuration comprising non alpha numeric perceptual primitives configured into metaphorical structures whose appearances location, and interactivity conveys information simultaneously about the orientation, location and operational parameters of the vehicle, and the processing system is configured to process the sensed parameters and to produce the visual display in non alpha numeric perceptual primitives according to the metaphorical structures, wherein the vehicle is an aircraft, said visual display is configured to be at least partially within a viewer's peripheral vision field, and at least part of the operational parameters are conveyed by perceptual primitives within the viewer's peripheral vision field, and the operational parameters include the drag curve for the aircraft and the airspeed of the aircraft.

9. In a vehicle as defined in any of claims 1, 2, 3 or 4, wherein the metaphorical structures are configured to convey the information across the widest extent possible of a viewer's visual field.

10. In a vehicle as defined in any of claims 1, 2, 3 or 4, wherein the metaphorical structures are configured to convey the information within a time frame of less than 200 milliseconds.

11. In a vehicle as defined in any of claims 1, 2, 3 or 4, wherein the visual display is configured so that at least one of the operational parameters is interactive with at least one orientation or location parameter.

12. In a vehicle as defined in any of claims 1, 2, 3 or 4, wherein the visual display is configured to be within a viewer's central and peripheral vision field, and all of the orientation, location and operational information is displayed within the viewer's central and peripheral vision field.

13. In a vehicle as defined in any of claims 1, 2, 3 or 4, wherein all parameters are encoded in the dimensions of the perceptual primitives that form the metaphorical structures.

14. In a vehicle as defined in any of claims 1, 2, 3 or 4, wherein the underling models or controlling algorithms by which parameters are displayed are encoded in the shape and interaction of the metaphorical structures.

15. In a vehicle as defined in any of claims 2, 3 or 4, wherein the vehicle is an aircraft, the operational parameters include the drag curve for the aircraft and the airspeed of the aircraft.

16. In a vehicle as defined in claim 15, where the visual primitives representing the metaphorical structure for the airspeed of the aircraft are interactive with the visual primitives representing the metaphorical structures for the drag curve.

17. In a vehicle as defined in claim 16, wherein the visual primitives representing the metaphorical structures for the orientation and location of the vehicle include a three dimensional star field metaphor.

18. In a vehicle as defined in any of claims 1, 2, 3 or 4, wherein the visual primitives representing the metaphorical structures for the operational parameters of the vehicle are interactive with the visual primitives representing the metaphorical structures for the orientation and location of the vehicle.

19. In a vehicle as defined in any of claims 1, 2 or 4, wherein the orientation and location parameters include orientation and location parameters of the vehicle relative to objects located within a 360 degree field of the vehicle, and wherein the metaphorical structures are configured to display the objects within the 360 degree field of the vehicle in a three dimensional display and to display the movement of the vehicle and the movement of the objects in the three dimensional display utilizing the angular scale of the three dimensional display.

20. In a vehicle as defined in any of claims 3 or 4, wherein said three dimensional display is based on a three dimensional star field metaphor.

21. In a vehicle as defined in any of claims 1, 2 or 3, wherein the orientation and location parameters include orientation and location parameters of the vehicle are represented by visual primitives forming a three dimensional display representing an externally stable frame of reference, and wherein the metaphorical structures include a representation of the movement of the vehicle in the three dimensional display utilizing the angular scale of the three dimensional display.

22. In a vehicle as defined in claim 21, wherein said three dimensional display is based on a three dimensional star field metaphor.

23. Apparatus as defined in any of claims 5, 6, 7 or 8 wherein said informational display is located remote from the vehicle.

24. Apparatus as defined in any of claims 5, 6, 7 or 8, wherein all parameters are encoded in the dimensions of the perceptual primitives that form the metaphorical structures.

25. Apparatus as defined in any of claims 8, 5, 6 or 7, wherein the underling models of vehicle behavior and the algorithms by which parameters are displayed are encoded in the shape and interaction of the metaphorical structures.

26. In a vehicle as defined in claim 1, wherein the visual primitives representing the metaphorical structure for the airspeed of the aircraft are interactive with the visual primitives representing the metaphorical structures for the drag curve.

27. In a vehicle as defined in claim 26, wherein the visual primitives representing the metaphorical structures for the orientation and location of the vehicle include a three dimensional star field metaphor.

* * * * *